United States Patent Office 2,877,217
Patented Mar. 10, 1959

2,877,217

PROCESS FOR POLYMERIZING COMPLETELY HALOGEN-SUBSTITUTED ETHYLENES

Bruce R. Thompson and Donald M. Young, Charleston, W. Va., assignors to Union Carbide Corporation, a corporation of New York No Drawing. Application June 23, 1954
Serial No. 438,861

5 Claims. (Cl. 260—92.1)

This invention relates to the production and use of a novel class of fluorine- and chlorine-containing bis(perhaloacyl) peroxides, and to a novel process for preparing them from the perhaloacyl fluorides formed by the degradative oxidation of polychlorotrifluoroethylenes. More especially the invention concerns the use of such peroxides as catalysts in the polymerization of completely halogen-substituted ethylenes free from hydrogen atoms and containing at least two different halogen atoms including at least one fluorine atom and one chlorine atom, such as chlorotrifluoroethylene, trichlorofluoroethylene, 1,1 - dichloro-2,2-difluoroethylene, and mixtures thereof. However, the novel catalysts also are useful for the polymerization of other halogen-substituted ethylenes such as vinyl chloride, vinyl fluoride, vinylidene chloride, and mixtures of halogen-substituted ethylenes with other monomeric polymerizable compounds containing an ethylenic double bond, such as the vinyl esters of the lower fatty acids, and the lower alkyl esters of acrylic and methacrylic acids.

In the commercial production of polychlorotrifluoroethylenes, as in the case of other resins, there is a fraction of off-grade resin that is unsalable. This may be scrap resin from the walls of autoclaves, etc., or resin which is above or below the molecular weight range required for commercial utility, or resin of a quality below acceptable standards. It has been found that such scrap resins can be degraded by oxidation to yield useful mixtures of chlorine-containing perhaloacyl fluorides and perhalocarbon oils. Such a process is described in the pending application Serial No. 368,224, filed July 15, 1953, by J. W. Clark and C. E. Rectenwald. These perhaloacyl fluorides apparently have structures corresponding to the formula

wherein X represents a radical of the class consisting of the F, Cl, CFCl$_2$, CF$_2$Cl and CF$_3$ radicals, and $n$ represents an integer from 1 to 10, and preferably from 1 to 5.

It has now been found that the various perhaloacyl fluorides present in the mixtures thereof with halocarbon oils produced in the aforesaid degradative oxidation process are converted by various procedures, directly, or if desired, in the form of their corresponding acyl chlorides or anhydrides, into a novel class of mixtures of bis(perhaloacyl) peroxides, apparently having structures represented by the formula

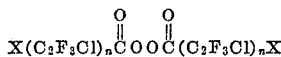

wherein X represents a radical of the class consisting of the F, Cl, CFCl$_2$, CF$_2$Cl and CF$_3$ radicals, and $n$ represents an integer from 1 to 10, and preferably from 1 to 5.

Thus, the chlorine-containing bis(perhaloacyl) peroxides of this invention can be prepared by vigorously agitating an aqueous solution of an alkali metal peroxide, such as sodium or potassium peroxide, at temperatures within the range between about 25° C. and about —15° C. or lower, with a chlorine-containing perhaloacyl halide, obtainable from a mixture of such perhaloacyl fluorides with halocarbon oils, such as those made by the degradative oxidation of a polychlorotrifluoroethylene, as described in the pending application, Serial No. 368,224, of J. W. Clark and C. E. Rectenwald, filed July 15, 1953. The perhaloacyl halide-containing reactant is dissolved in an organic water-immiscible solvent which is also a solvent for the bis(perhaloacyl) peroxides, and is substantially inert to the reactants. Preferred solvents are fully halogen-substituted saturated hydrocarbons such as trichlorofluoromethane, 1,1,2-trichloro - 1,2,2 - trifluoroethane, dichlorodifluoromethane, decafluorobutane, and mixtures thereof. Preferably the water or aqueous solution is cooled to 0° C. or below, after which the alkali metal peroxide is added slowly, followed by the organic solvent or mixture of solvents. The temperature of the mixture then is adjusted to from around 25° C. to around —15° C. or lower, and the chlorine-containing perhaloacyl halide or mixture containing such halide is added rapidly—usually within a few seconds—with vigorous agitation, during which time the temperature of the reaction mixture increases in an amount depending upon the efficacy of the cooling. Immediately upon completion of the reaction, which is very rapid and usually is completed within 2 minutes or less, the mixture is allowed to stratify promptly, and the organic solvent layer which contains the desired peroxide is separated from the aqueous layer and is stored at temperatures preferably around —15° C. or below, because of the relatively fast rate of decomposition at higher temperatures. The bis(perhaloacyl) peroxide can be recovered from this solution, but this is not necessary since the solutions of these peroxides made in the process are highly effective as catalysts for the polymerization of chlorotrifluoroethylene and other ethylenically unsaturated compounds. Dilute solutions of the peroxide mixtures in perhalogenated solvents containing as much as 5 grams thereof per 100 cc. of solution are apparently safe to handle.

The perhaloacyl fluorides useful in the production of the novel peroxides of the invention can be made by heating a polychlorotrifluoroethylene to temperatures between 250° C. and around 375° C. to form a body of molten polymer, passing a gas containing oxygen, e. g. air, through the molten polymer, and removing from the zone of oxidation a gaseous mixture containing unreacted oxygen and oxidation products of said polymer. Such oxidation products can be subjected to hydrolysis, or to a washing with an alkali, in either of which cases the perhaloacyl fluorides are converted to and recovered in the form of the corresponding acids and salts, respectively. These are readily convertible to the corresponding acyl chlorides, which are useful starting materials, as shown in Example 2. An excess of the oxidizing gas, such as air, oxygen, ozone, etc., is fed to the reactor to assist in the prompt removal of the volatile products from the reactor before other or further decomposition occurs.

The products obtained by the degradative oxidation of polychlorotrifluorethylenes and useful as starting materials in making the novel peroxides are mixtures of perhaloacyl fluorides and perhalocarbon oils. The presence of these oils has no detrimental effect upon the resins produced when using the peroxide catalysts of the invention in the polymerization of chlorotrifluoroethylene. However, if desired, selected fractions of the distilled mixture of oils and perhaloacyl fluorides can be hydrolyzed, thereby converting the contained acyl fluorides to the corresponding perhaloalkanoic acids. The latter are substantially higher boiling than the oils, and can then be separated by fractional distillation. Thereafter the said acids are readily converted to the corresponding acid chloride in well known manner, and the mixture of acid chlorides can be used directly or can be fractionally distilled, and selected fractions converted to the corresponding bis(perhaloacyl) peroxides. Preferably fractions substantially free from 2-carbon compounds are used.

Since the degradative oxidation of polychlorotrifluoroethylenes yields a mixture of perhaloacyl fluorides of different molecular weights, the peroxides obtained from such a mixture of the fluorides have a corresponding molecular weight distribution. If desired, the mixture of perhaloacyl fluorides and perhalocarbon oils, or the perhaloalkanoic acids made therefrom, can be fractionally distilled to secure selected fractions for conversion to the corresponding peroxides by the process. This has been found to be unnecessary. However, it is preferable to remove from the mixture of perhaloacyl fluorides and perhalocarbon oils any chlorodifluoroacetyl fluoride and other two-carbon products present therein by distillation in order to facilitate the handling of this mixture during the peroxide-forming reaction. Mixtures of perhaloacyl halides having average molecular weights of around 200 or more yield peroxides highly useful in the polymerization of chlorotrifluoroethylene.

The polychlorotrifluoroethylenes useful for the production of the perhaloacyl halide starting materials can range from the commercial molding-grade resins of high molecular weight and melting points of 300° C. or higher to the waxes and oils of lower average molecular weights. Scrap polymer, obtained as a result of polymerization or fabrication operations, also is suitable as starting material, and has the important advantage of lower cost.

The novel chlorine-containing bis(perhaloacyl) peroxides of the invention have high utility for the polymerization of chlorotrifluoroethylene. The polymerization conveniently is conducted at temperatures between 0° C. and 30° C., but a range of 15° to 25° C. is preferred. Autogenous superatmospheric pressures and higher pressures are useful. Generally a catalyst concentration between 0.005% and 1.0% on the weight of the monomer is used. The preferred range is 0.01 to 0.1 percent. The catalyst is usually added in the form of a solution thereof in a solvent, preferably a solvent without substantial effect upon the polymerization, such as a completely halogen-substituted alkane containing one or more fluorine atoms attached to each carbon atom, with or without one or more atoms of chlorine. The polymerization can be conducted in an atmosphere of an inert gas such as nitrogen, although this is not necessary. All of the catalyst can be added to the initial charge, or it can be added in increments during the polymerization in the modification wherein the polymerization is conducted in a continuous manner.

The following examples serve to illustrate the invention.

*Example 1*

To each of three chilled glass tubes were added 50 grams of chlorotrifluoroethylene and 0.0125 gram of the bis(perhaloacyl) peroxide mixture described hereinafter in the form of a dilute solution of the peroxide in a 50/50% by volume mixture of trichlorofluoromethane and 1,1,2-trichloro-1,2,2-trifluoroethane. The tubes were flushed with nitrogen, sealed and placed in a water bath maintained at 20° C. for 25 hours. The tubes then were chilled in Dry Ice and opened. The stiff slurry of polymer in monomer from the tubes was allowed to warm up to volatilize the monomer and was then heated for 2 hours in an oven held at 55°–60° C. A conversion of 9.9% of monomer to polymer was obtained.

The melt viscosities of the resins recited herein are measured at 230° C. on a parallel plate plastometer by the process described by G. J. Dienes and H. F. Klemm in the Journal of Applied Physics, vol. 17, pages 458–471 (June 1946). Herein the melt viscosity is employed as a measure of molecular weight on a relative basis. The resin of this example had a melt viscosity of 41 megapoises at 230° C. Commercial grades of such resins range from about 5 to about 50 megapoises. The color of the resin after being subjected to the melt viscosity determination was judged to be good.

The production of the aforesaid bis(perhaloacyl) peroxide mixture was conducted as follows: to a vigorously agitated solution of 7.8 grams of sodium peroxide in 100 cc. of water and 395 grams of "Freon 113," i. e., 1,1,2-trichloro-1,2,2-trifluoroethane, cooled to about −5° C. were rapidly added en masse 70 grams of a crude oxidized polychlorotrifluoroethylene oil containing approximately 50% of a chlorine-containing perhaloacyl fluoride having an average molecular weight of 466, and made as hereinafter described. The temperature of the reaction mixture increased slightly and then levelled off. The agitation was then stopped and the liquid stratified at once. The "Freon" layer was separated from the aqueous layer and the peroxide content of the "Freon" layer was analyzed by a standard thiosulfate method. A 5 cc. aliquot portion of a total volume of 250 cc. required 4.3 cc. of 0.1 N sodium thiosulfate solution, indicating a yield of 29% of the bis(perhaloacyl) peroxide.

The oxidized polychlorotrifluoroethylene oil starting material was made by charging 5305 grams of polychlorotrifluoroethylene melting at about 140° C. to a reactor heated to from 325° to 350° C., and oxygen was fed into the mass of molten resin at the rate of about 30 liters per hour. The effluent gas from the reactor was passed through a water-cooled condenser and receiver and then recycled through the reactor along with gaseous products at a rate of about 960 liters per hour. A sidestream from the recycled gas was passed through a water-cooled condenser and then through Dry Ice-cooled traps. The condensate from the Dry Ice traps was stripped by distillation to a head temperature of 70° C. at atmospheric pressure to remove 1- and 2-carbon compounds. The still residue was combined with a distilled fraction of the water condensate having a boiling range from about 70° C. at atmospheric pressure to about 50° C. under 1 mm. of mercury pressure. This mixture contained about 50% of chlorine-containing perhaloacyl fluorides having an average molecular weight of 466.

*Example 2*

Using the bis(perhaloacyl) peroxide catalyst described in this example, and the polymerization conditions described in Example 1, with the exception that three different polymerization temperatures and two different times were used, the results recited in the following table were secured in the polymerization of chlorotrifluoroethylene.

| Polymerization Temperature ° C. | Polymerization Time, hours | Monomer Conversion, percent | Polymer Melt Viscosity at 230° C., megapoises |
|---|---|---|---|
| 12.5 | 24 | 15.9 | 58 |
| 20 | 16 | 12.5 | 24 |
| 30 | 16 | 7.9 | 9.5 |

The aforesaid bis(perhaloacyl) peroxide was made by mixing 56 cc. of an aqueous solution of sodium peroxide, equivalent to 4.4 grams of the peroxide, and 315 grams of "Freon 113." After cooling the mixture to 4° C., 18 grams of a mixture of perhaloacyl chlorides, made as hereinafter described, was added all at once with vigorous agitation. The reaction temperature increased from 4° C. to 17° C. in one minute and then started to drop. The reaction mixture was promptly transferred to a cooled separatory funnel; the "Freon" layer immediately separated from the aqueous layer and was analyzed for peroxide content by titration of an aliquot portion with a standard thiosulfate solution. This titration indicated a 70% yield of the bis(perhaloacyl) peroxide.

The perhaloacyl chloride starting material used in this example was made by heating to 70° C. in a flask connected with a fractionating column 87 grams of a mixture of low molecular weight aliphatic perhaloalkanoic acids boiling in the range from 100° to 130° C. under 50 mm. pressure and 78 grams of benzotrichloride until evolution of hydrogen chloride ceased. The reaction mixture was distilled at 90-103° C. at atmospheric pressure to give 66 grams of crude product which was fractionally distilled at atmospheric pressure to yield 49 grams of mixed perhaloacyl chlorides boiling within the range from 94° to 100° C. at atmospheric pressure and having an average molecular weight of 214, as determined by titration with standard base. This acyl chloride was reacted with sodium peroxide as described above.

The perhaloalkanoic acid mixture used in making the corresponding acyl chloride was secured by heating polychlorotrifluoroethylene to around 355°-360° C. while passing a stream of gases containing oxygen therethrough, removing volatile oxidation products as formed, and fractionally distilling them. Such a process is disclosed in the aforesaid pending application Serial No. 368,224 of J. W. Clark and C. E. Rectenwald. The fraction of the resulting distillate boiling in the range 70° to 90° C. (152 grams) was hydrolyzed by agitating it with 13 grams of water for 1.5 hours in a copper beaker. This mixture then was heated to 50°-60° C. while bubbling nitrogen therethrough to remove hydrogen fluoride. The residue was fractionally distilled under vacuum, and the perhaloalkanoic acid fraction boiling within the range from 100° to 130° C. under 50 mm. pressure was separated and used in the preparation of the corresponding acyl chloride. The latter was used in making the peroxide.

*Example 3*

Using the bis(perhaloacyl) peroxide catalyst mixture prepared as described in this example, and the polymerization conditions described in Example 1, excepting that a catalyst concentration of 0.025%, based upon the chlorotrifluoroethylene, a polymerization temperature of 20° C., and a polymerization time of 16 hours were used, a polychlorotrifluoroethylene yield of 10.7% was secured; and the polymer had a melt viscosity of 32 megapoises at 230° C.

The said catalyst mixture was made by adding with vigorous agitation to 395 grams of "Freon 113" cooled to 0° C., 100 cc. of an aqueous solution of 7.8 grams of sodium peroxide. To the resultant mixture, cooled to —5° C., were added en masse 105.3 grams of crude, oxidized polychlorotrifluoroethylene oil made by the process described in the aforesaid J. W. Clark and C. E. Rectenwald application, Serial No. 368,224, and containing 33% of a mixture of perhaloacyl fluorides having an average molecular weight of 234. The temperature of the reaction mixture increased from —5° C. to 10° C. in 40 seconds and then started to drop. The agitation then was stopped and the mixture immediately stratified. The lower "Freon" layer containing the mixture of bis(perhaloacyl) peroxides was separated and analyzed by titration with a standard sodium thiosulfate solution, indicating a yield of 64.5% of the mixed bis(perhaloacyl) peroxides.

The perhaloacyl fluorides used as starting material were made by passing oxygen through a liquid polychlorotrifluoroethylene heated at 330°-350° C. in a flask connected with a still column having a water-cooled head. The liquid condensate, after removal of volatiles, was distilled, and the distillate boiling between 0° C. at atmospheric pressure and 175° C. under 50 mm. of mercury pressure was used in making the peroxide.

*Example 4*

To each of three chilled glass tubes were added 50 grams of chlorotrifluoroethylene and 0.018 gram of the bis(perhaloacyl) peroxide mixture, made as hereinafter described in this example, in the form of a dilute solution of the peroxide in a mixture of trichlorofluoromethane and 1,1,2-trichloro-1,2,2-trifluoroethane. The tubes were flushed with nitrogen, sealed, and placed in a water bath held at 20° C. for 16 hours. The monomer was permitted to volatilize from the resultant polymer slurry, and the residual polymer was heated at 55°-60° C. for two hours. The following table, which includes data on this as well as on a duplicate polymerization, shows the production of polychlorotrifluoroethylenes of relatively high molecular weight at good polymerization rates.

| Polymerization Temperature °C. | Polymerization Time, hours | Monomer Conversion, per cent | Polymer Melt Viscosity at 230° C., megapoises |
|---|---|---|---|
| 20 | 16 | 10.1 | 25 |
| 20 | 16 | 10.6 | 25 |

The peroxide catalyst employed was made by adding en masse 34.5 grams (0.11 mol) of a mixture of perhaloacyl chlorides having an average molecular weight of 318, made as hereinafter described, to a vigorously agitated mixture of (1) 100 cc. of an aqueous solution containing 7.8 grams (0.10 mol) of sodium peroxide and (2) 250 cc. of "Freon 113," cooled to 3° C. The reaction temperature increased to 10.5° C. for a brief time and then began to drop. The reaction mixture then was allowed to separate into two layers, and the lower "Freon" layer was removed and examined. The titration of an aliquot portion of that layer by the standard thiosulfate method indicated an 82% yield of bis(perhaloacyl) peroxides. For the purpose of elemental analyses, a portion of the said peroxide mixture was saponified with sodium peroxide at temperatures gradually increasing from —40° C. to 10° C. "Freon" was removed by distillation, the latter being completed in the presence of water to a head temperature of 80° C. The residue of the sodium salts of the corresponding perhaloalkanoic acids in water showed upon analysis 1.7% of chlorine and 2.5% of fluorine.

The perhaloacyl chloride mixture used in making the peroxide in this example was prepared by heating together 98 grams of benzotrichloride and 120 grams of a mixture of low molecular weight aliphatic perhaloalkanoic acids boiling in the range from 125° C. to 175° C. at 50 mm. of mercury pressure. After the reaction mixture reached 100° C. it was fractionally distilled at atmospheric pressure, yielding a mixture of perhaloacyl chlorides boiling within the range from 135° C. to 146° C. This fraction, which was used to make the bis(perhaloacyl) peroxide, contained 19.3% of carbon, 34.6% of chlorine and 37.9% of fluorine, and had an average molecular weight of 318, based on a titration thereof with standard methanolic potassium hydroxide.

The perhaloalkanoic acid mixture used in making the aforesaid perhaloacyl chloride mixture was obtained by heating polychlorotrifluoroethylene to around 345°-350° C. while passing a stream of oxygen therethrough at the rate of about 5–5.5 liters per hour of oxygen per kilogram of polychlorotrifluoroethylene for at least 16 hours, removing and recovering volatile oxidation products as formed, and then fractionally distilling the recovered oxidation products. Then 1956 grams of the resulting perhaloacyl fluoride-containing oxidation products boiling in the range from 110° C. to 150° C. were hydrolyzed by agitation for 1 hour with 61 grams of water at 50°-90° C. in a stainless steel container. Nitrogen then was bubbled through the mixture held at approximately 100° C. to remove hydrogen fluoride, after which the mixture was fractionally distilled under vacuum. The perhaloalkanoic acid fractions boiling within the range from 125° C. to 175° C. under 50 mm. of mercury pressure were used in the preparation of the aforesaid perhaloacyl chloride mixture.

This invention has made possible the production of polychlorotrifluoroethylenes of satisfactory molecular weights and thermal stabilities at polymerization rates as good as those obtained with the best catalyst known in the prior art, while utilizing for the purpose peroxides made from relatively inexpensive perhaloacyl compounds obtained from scrap polymer.

The invention is susceptible of modification within the scope of the appended claims.

We claim:

1. Process for making homopolymers and copolymers of at least one completely halogen-substituted ethylene containing at least two different halogen atoms including at least one fluorine atom and at least one chlorine atom, which comprises contacting and reacting under polymerizing conditions of temperature and pressure at least one completely halogen-substituted ethylene having only chlorine and fluorine substituents, and a small amount of a mixture of bis(perhaloacyl) peroxides having structures corresponding to the formula

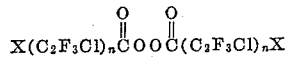

wherein X represents a radical of the class consisting of the F, Cl, $CFCl_2$, $CF_2Cl$ and $CF_3$ radicals, and $n$ represents an integer from 1 to 10, said mixture of peroxides containing at least one fluorine atom attached to each carbon atom with the exception of the carbonyl carbon atoms and being produced by the reaction of an alkali metal peroxide with a mixture of perhaloacyl halides wherein chlorine and fluorine are the only halogens present, the said perhaloacyl halide mixture having an average molecular weight of at least about 200 and being derived by the degradative oxidation of a polychlorotrifluoroethylene with an oxygen-containing gas at elevated temperatures within the range from about 250° C. to about 375° C., said halogen-substituted ethylene containing at least one chlorine atom and at least one fluorine atom.

2. Process as defined in claim 1 wherein the said reaction is conducted in the presence of a water-immiscible completely halogen-substituted alkane containing both fluorine and chlorine as the only halogens and having at least one fluorine atom attached to each carbon atom.

3. Process for making homopolymers and copolymers of at least one completely halogen-substituted ethylene containing at least two different halogen atoms including at least one fluorine atom and at least one chlorine atom, which comprises contacting under polymerizing conditions of temperature and pressure chlorotrifluoroethylene and a small amount of a mixture of bis(perhaloacyl) peroxides having structures corresponding to the formula

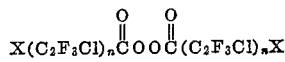

wherein X represents a radical of the class consisting of the F, Cl, $CFCl_2$, $CF_2Cl$ and $CF_3$ radicals, and $n$ represents an integer from 1 to 10, said mixture of peroxides containing at least one fluorine atom attached to each carbon atom with the exception of the carbonyl carbon atoms, and being produced by the reaction of an alkali metal peroxide with a mixture of perhaloacyl halides wherein chlorine and fluorine are the only halogens present, the said perhaloacyl halide mixture having an average molecular weight of at least about 200 and being derived by the degradative oxidation of a polychlorotrifluoroethylene resin with an oxygen-containing gas at elevated temperatures within the range from around 250° C. to around 375° C.

4. Process for making homopolymers and copolymers of at least one completely halogen-substituted ethylene containing at least two different halogen atoms including at least one fluorine atom and at least one chlorine atom, which comprises contacting under polymerizing conditions of temperature and pressure at least one completely halogen-substituted ethylene having only chlorine and fluorine substituents, and a small amount of a mixture of bis(perhaloacyl) peroxides having structures approximately corresponding to the formula

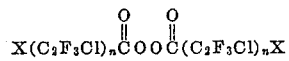

wherein X represents a radical of the class consisting of the F, Cl, $CFCl_2$, $CF_2Cl$ and $CF_3$ radicals, and $n$ represents an integer from 1 to 5, said mixture of peroxides containing at least one fluorine atom attached to each carbon atom with the exception of the carbonyl carbon atoms, and being produced by the reaction of an alkali metal peroxide with a mixture of perhaloacyl halides having chlorine and fluorine as the sole halogens, the said perhaloacyl halide mixture having an average molecular weight of at least about 200 and being derived by the degradative oxidation of polychlorotrifluoroethylene resins with an oxygen-containing gas at elevated temperatures within the range from around 250° C. to around 375° C., said halogen-substituted ethylene containing at least one chlorine atom and at least one fluorine atom.

5. Process as defined in claim 4 wherein the halogen-substituted ethylene is chlorotrifluoroethylene.

References Cited in the file of this patent

UNITED STATES PATENTS

| | | |
|---|---|---|
| 2,559,630 | Bullitt | July 10, 1951 |
| 2,700,662 | Young et al. | Jan. 25, 1955 |
| 2,705,706 | Dittman et al. | Apr. 5, 1955 |